Aug. 14, 1945.

F. R. ROTT 2,382,174

SCALE PRINTING APPARATUS

Filed April 7, 1943

INVENTOR.
F. R. ROTT
BY
*Harry C. Duft*
ATTORNEY

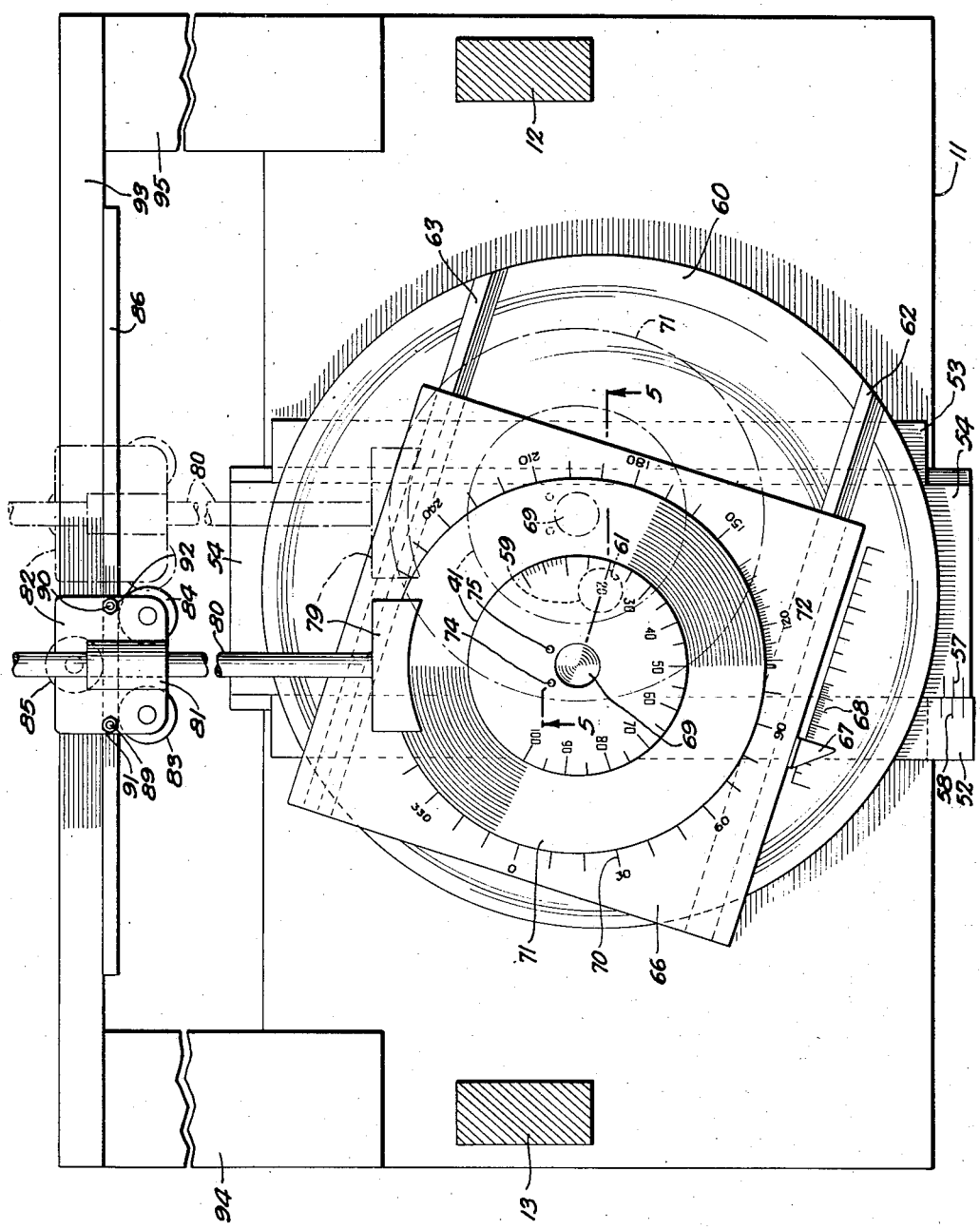

Aug. 14, 1945.　　　　F. R. ROTT　　　　2,382,174
SCALE PRINTING APPARATUS
Filed April 7, 1943　　　　4 Sheets-Sheet 3
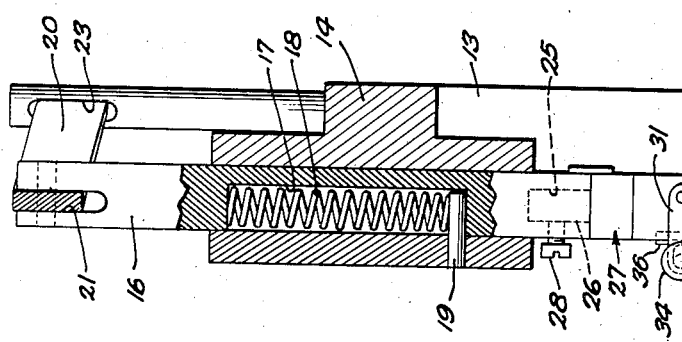
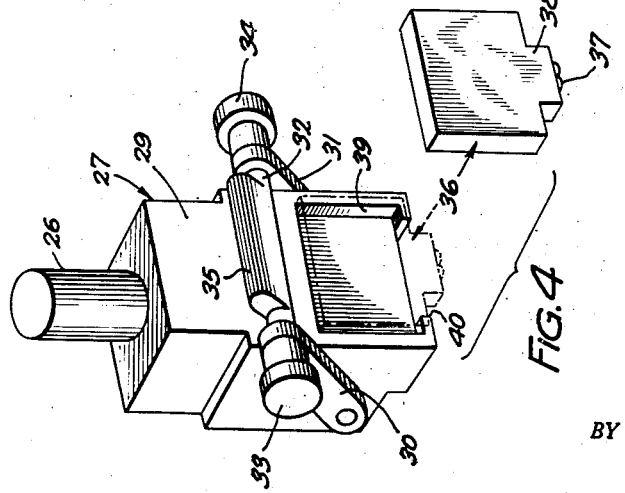
INVENTOR.
F. R. ROTT
BY
Harry L. Anft
ATTORNEY Aug. 14, 1945.　　　　F. R. ROTT　　　　2,382,174
SCALE PRINTING APPARATUS
Filed April 7, 1943　　　4 Sheets-Sheet 4
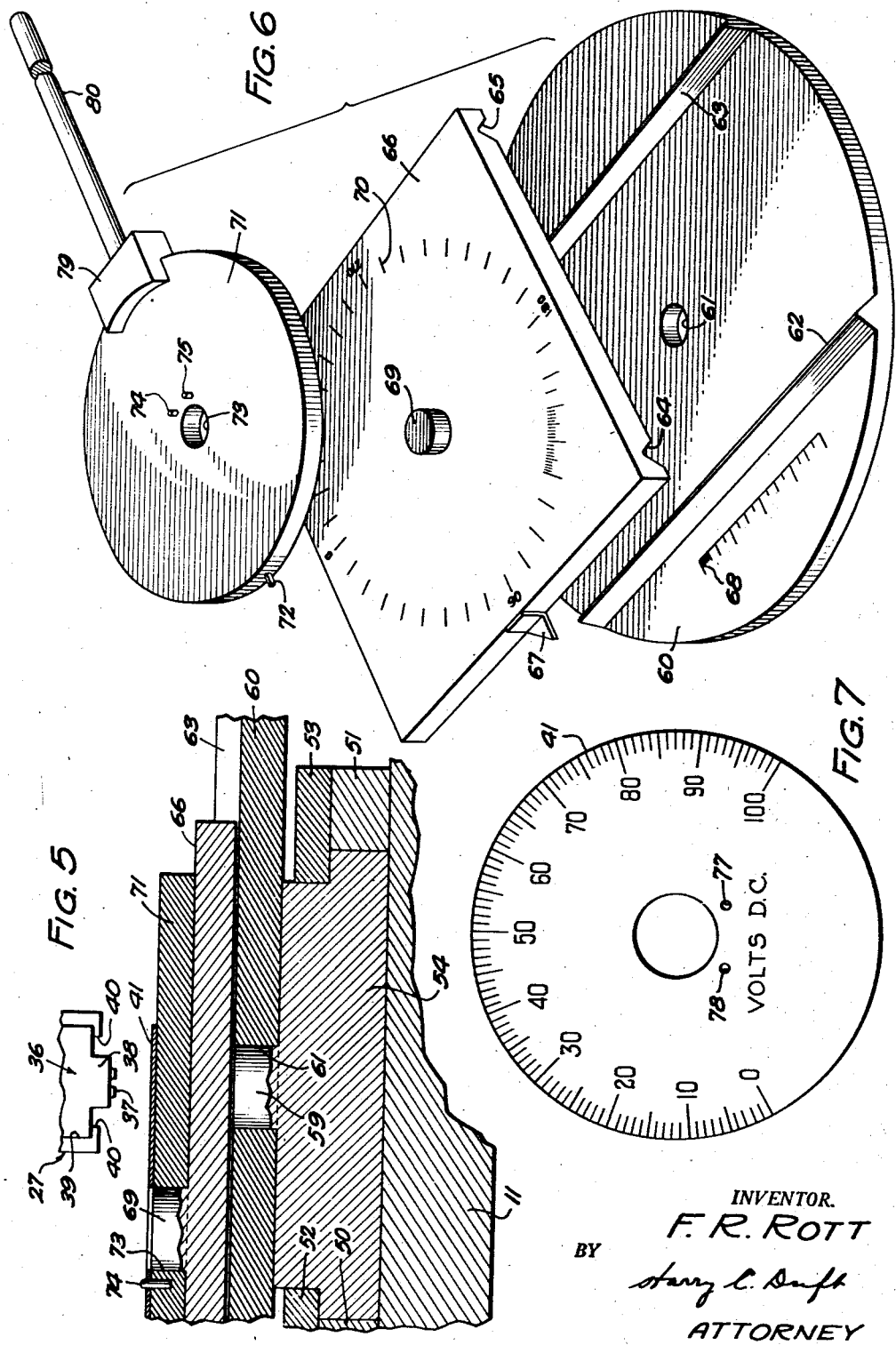
INVENTOR.
F. R. ROTT
BY
ATTORNEY Patented Aug. 14, 1945

2,382,174

UNITED STATES PATENT OFFICE 2,382,174

SCALE PRINTING APPARATUS

Frank R. Rott, Downers Grove, Ill., assignor to Western Electric Company, Incorporated, New York, N. Y., a corporation of New York Application April 7, 1943, Serial No. 482,084

7 Claims. (Cl. 101—41)

This invention relates to a scale printing apparatus and more particularly to an apparatus for printing indicia or meter scales.

In the manufacture of precision electrical instruments having indicating needles or pointers movable angularly across the face of a dial to indicate an electrical characteristic being measured, it is practically impossible to manufacture instruments with a degree of accuracy such that the angle of needle deflection will be the same in all of a group of meters. For example, in two voltmeters designed to measure from zero to one hundred volts, one of the meters might deflect its needle through ten degrees in indicating an increase of from ten to twenty volts, whereas the other meter might deflect its needle through fifteen degrees to indicate an increase of from ten to twenty volts. An apparatus for printing line graduations on a scale is illustrated in Patent No. 2,023,596 to L. J. Koci, issued December 10, 1935. However, insofar as applicant is aware, no mechanism has ever been devised for locating the numerical indicia in a position opposite selected points on the scale with a high degree of accuracy.

It is an object of the present invention to provide an apparatus for printing numerical indicia in substantially exact alignment with graduations marked on meter scales and for accurately locating captions on the scales.

In accordance with one embodiment of the invention, printing apparatus is provided wherein a stationary framework is provided in which removable type slugs are slidable vertically above a series of interlocked plates, on the upper one of which a meter scale, having been marked with graduations in a suitable manner, may be placed. The bottom plate of the series of interlocking plates is slidable in ways to adjust all of the superposed plates in accordance with the size of type selected for use in printing designations on the scale and after this plate is once set, a circular plate superposed thereon may be rotated about a stud positioned centrally on the bottom plate. The circular plate thus rotatable on the bottom plate has rails formed on it which extend into grooves formed in the bottom of a rectangular plate whereby the rectangular plate may be slid on the rotatable plate to carry a scale supporting disc in a direction parallel to the rails on the rotatable plate. The scale supporting disc is fixed against rotary motion by a rod slidable through a carriage, which is, in turn, slidable on a fixed rail, whereby the scale supporting disc is always held in a predetermined angular position with respect to the reciprocable type so that any designations printed on the scale held thereby will always be parallel to all of the other designations printed thereon.

A better understanding of the invention will be had by reference to the following detailed description when considered in conjunction with the accompanying drawings, wherein Fig. 1 is a front elevational view of a scale printing apparatus constituting a preferred embodiment of the present invention;

Fig. 2 is a plan section taken substantially along the line 2—2 of Fig. 1 in the direction of the arrows and showing the assembled plates in plan elevation;

Fig. 3 is a vertical sectional view taken substantially along the line 3—3 of Fig. 1 in the direction of the arrows showing the type reciprocating mechanism, parts being broken away to illustrate the mechanism directly behind them;

Fig. 4 is an exploded perspective view in detail of a type slug and the mechanism for holding the type slug which may be mounted in the apparatus;

Fig. 5 is a fragmentary detailed sectional view taken substantially along the line 5—5 of Fig. 2 in the direction of the arrows showing the connections between the various superposed plates on an enlarged scale;

Fig. 6 is an exploded perspective view of the three upper plates of the apparatus;

Fig. 7 is an enlarged view of a meter scale printed on the apparatus shown in the other figures.

Figure 1:
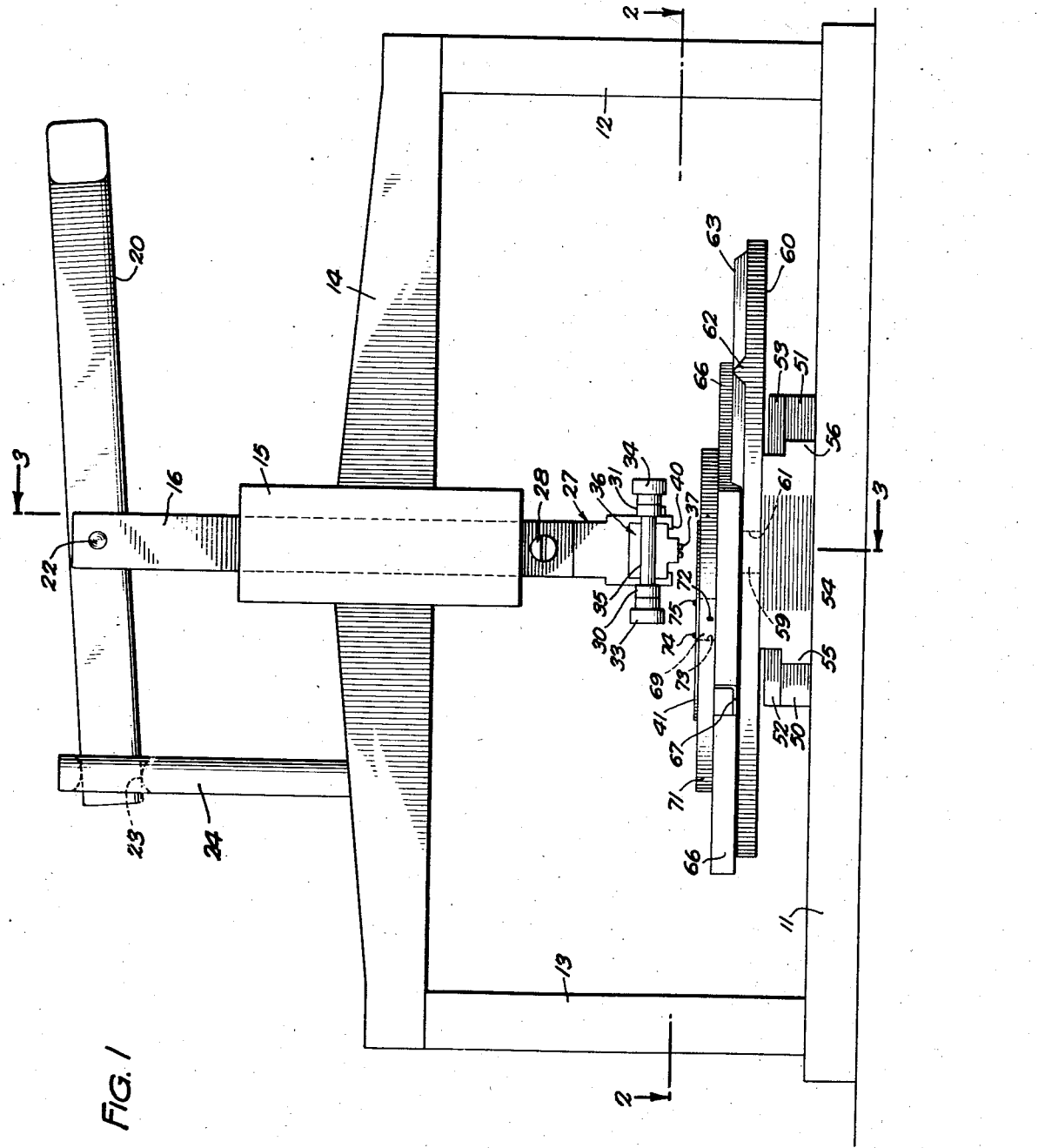

Referring to the drawings, wherein like reference characters designate the same parts throughout the several views, particular reference being first had to Figs. 1 and 3, it will be seen that the apparatus includes a base plate or bed 11, from which there extend upwardly suitable standards 12 and 13. The standards 12 and 13 support, at their upper ends, a cross frame 14, carrying a plunger support 15. Slidable in the plunger support 15 is a type supporting plunger 16, which is provided with a cut-out portion 17, in which a compression spring 18 is nested. The spring 18, at its lower end, bears against a pin 19 extending into the plunger support 15 and at its upper end engages the shoulder formed in the plunger 16 at the end of the cut-out portion 17. The plunger 16 is thus urged upwardly to the position shown in Figs. 1 and 3 by the spring 18 and may be moved downwardly to effect a printing operation by manipulation of a handle 20, which extends through a slot 21 cut in the upper end of the plunger 16 and is pivoted about a pin 22 fixed in the upper end of the plunger 16. The left end (Fig. 1) of the handle 20 extends into a slot 23 formed in a post 24 mounted on the cross frame 14 between the standard 13 and the plunger support 15.

At its lower end, the plunger 16 has a socket 25 formed in it for receiving the shank 26 of a type slug carrier designated generally by the numeral 27. A set screw 28 threaded into the plunger 16 serves to lock the carrier 27 in position on the lower end of the plunger 16. As seen most clearly in Fig. 4, the type slug carrier comprises, in addition to the shank 26, a body portion 29, on which are pivoted a pair of arms 30 and 31 carrying, at their free ends, a shaft 32, which, in turn, has a pair of thumb nuts 33 and 34 suitably attached to it for rotating it to carry a wedging projection 35 into engagement with a type slug 36. The type slug 36 has type 37 formed on a projecting portion 38 thereof and is adapted to nest in a socket 39 formed in the body of the carrier 27 and is provided with a bottom opening 40, through which the projection 38 extends for engaging the type with a meter scale 41 to be printed.

Suitably fixed to the upper surface of the base plate or bed 11 are a pair of bars 50 and 51, to which are attached retainer plates 52 and 53, respectively, which cooperate with the bars to form ways for holding a plate 54 on the bed 11 while permitting it to slide toward the front or rear of the bed 11, the plate 54 being provided with shoulders 55 and 56 which ride under the plates 52 and 53, respectively. The left edge of plate 54 has graduations marked on it, as shown at 57, and the retainer plate 52 has cooperating graduations 58 marked on it whereby the position of the plate 54 with respect to the type of the type carrier 27 may be adjusted in accordance with the size of type being used, as will be described more in detail hereinafter. The plate 54 has extending upwardly from it a pivot stud 59, about which a circular plate 60 may be rotated manually. The plate 60 is provided with an aperture 61 concentric with its periphery for receiving the pivot stud 59, whereby the plate 60 may be rotated around the axis of the pivot stud 59.

Formed on the upper surface of the plate 60, as shown most clearly in Fig. 6, are a pair of rails 62 and 63, which are adapted to enter corresponding grooves 64 and 65 formed on the undersurface of a rectangular plate 66. The rectangular plate 66 has a pointer 67 fixed to its left edge (Fig. 6) for cooperation with a graduated scale 68, described on the upper surface of the plate 60, whereby the position of the rectangular plate 66 with respect to the plate 60, and, accordingly, with respect to the type in the type carrier 27, may be readily determined for a purpose which will become apparent as the description progresses.

The rectangular plate 66 has a pivot stud 69 positioned in the center of it and has a graduated scale 70 scribed on its upper surface. The scale 70 may be marked in degrees or in any other suitable manner to form indicia for indicating the relative position of the plate 66 with respect to a scale supporting disc 71, which has a pointer 72 extending outwardly from it. The scale supporting disc 71 is provided with a central aperture 73, which is adapted to receive the pivot stud 69, whereby, when the plate 60 is rotated, the rectangular plate 66, if its pivot stud 69 is out of axial alignment with the pivot stud 59 on plate 54, will move the scale supporting disc 71 eccentrically of the stud 59. Extending upwardly from the scale supporting disc 71 are a pair of pins 74 and 75, on which the scale 41 to be printed, as shown most clearly in Fig. 7, may be located by placing the scale in position with the pins 74 and 75 extending through apertures 77 and 78 in the scale.

Attached to the rear end of the scale supporting disc 71 is a bracket 79, which supports a rod 80. The rod 80 is freely slidable in a bearing 81, which is mounted upon the upper surface of carriage plate 82. The carriage plate 82, in addition to supporting the bearing 81, has three freely rotatable guide wheels 83, 84 and 85 mounted on it for engaging opposite sides of a guide rail 86. Threaded in the plate 82 are a pair of screws 89 and 90, which are locked in place by means of lock nuts 91 and 92. The screws 89 and 90 serve to accurately position the carriage plate 82 with respect to the guide rail 86 by engaging the upper surface thereof. The guide rail 86 is suitably attached to a cross bar 93, which is, in turn, mounted on the ends of a pair of support plates 94 and 95 secured to the base plate or bed 11 adjacent its ends.

A better understanding of the apparatus may be had by reference to the following brief description of the mode of operation thereof in printing a scale plate, for example, a scale plate for use on a voltmeter. In order to print the number designations and caption on a scale plate to be used on a voltmeter, the graduations may be printed upon the scale by practicing the method and using the apparatus of the Koci patent, hereinbefore identified. By utilizing that method, the position of the lines on the scale may be very accurately controlled and the scale plate 41 may then be positioned on the scale supporting disc 71 with the pins 74 and 75 extending through the apertures 77 and 78, respectively. It should be noted, as shown particularly in Fig. 2 that when the scale plate is mounted on the disc 71, the printing will be done upside down, thus to facilitate the use of the apparatus. After a scale 41 has thus been prepared and placed on the disc 71, the position of the plate 54 may be adjusted with respect to the scale 58 in accordance with the size of type to be used in printing on the dial or scale 76 and the caption "Volts D. C." and any other information desired may be printed on the face of the scale 41 by manipulating the handle 20 after a suitable type slug has been locked in the carrier 27 and the position of the printed matter on the scale may be gaged by sliding the rectangular plate 66 with respect to the circular plate 60 after the rails 62 and 63 have been moved to a position parallel with the edges of the slidable plate 54, the pointer 67 cooperating with the graduated scale 68 being utilized to properly locate the scale 76 under the type slug 36.

Since usually the size of type used for printing the caption is different from the size of type to be used in printing the numerals on the face of the scale 41, the position of the plate 54 will have to be adjusted to compensate for the type size being used before the numerals are printed on the scale 41. After this adjustment has been made, the circular plate 60 may be rotated about the stud 59 until the pointer 72 is in registration with a predetermined point on the scale 70 described on rectangular plate 66, the angular position of the plate 60 being selected in accordance with the information gathered in testing the meter. In other words, the table 60 may be rotated angularly a number of degrees as determined by the tests to locate the scale 41 with respect to the type slug 36 so that the center of the type on the type slug will be at the exact angle at which the indicia represented by the type slug should be printed. In other words, the scale plate will be so located that when the type is moved down and prints on it, the lines scribed on the scale would, if projected, intersect the center of the figure or figures printed on the scale. In this manner, the angular position of the numbers may be set with an exceedingly high degree of accuracy and by sliding the rectangular plate 66 with respect to the plate 60, without, however, displacing the plate 60, the proximity of the printed numbers to the inner ends of the scribed lines on the dials may be gaged visually. It should be noted that when the circular plate 60 is rotated, the disc 71 will not rotate but will move in a circular path about the axis of the pivot stud 59 at a distance depending upon the eccentricity of the stud 69 with respect to the stud 59 and in this manner, since the angle at which the type 37 strikes the scale is not variable, all of the printing done on the scale 41 will be parallel.

What is claimed is:

1. In a meter scale printing apparatus, a track member, a carrier movable along said track, a bearing on said carrier, a rod slidable in said bearing, a scale supporting disc fixed to said rod, and means for supporting said scale supporting disc for movement in a circular path.

2. In a meter scale printing apparatus, a scale supporting disc, a rod attached to said disc, means for supporting said rod for movement in all directions in a predetermined plane while maintaining the rod in parallel positions, a rotatable main supporting plate, a scale plate slidable on said main supporting plate, a pivot stud extending from said slidable plate, a passageway in said disc having its side walls in engagement with the pivot stud on the slidable plate, a pointer on the disc, and a scale on the slidable plate cooperating with said pointer to indicate the degrees of rotation of the main supporting plate.

3. In a meter scale printing apparatus, a scale supporting disc, a rod attached to said disc, means for supporting said rod for movement in all directions in a predetermined plane while maintaining the rod in parallel positions, a rotatable main supporting plate, a slidable plate slidable on said main supporting plate, a pivot stud extending from said slidable plate, a passageway in said disc having its side walls in engagement with the pivot stud on the slidable plate, a pointer on the disc, a scale on the slidable plate cooperating with said pointer to indicate the degrees of rotation of the main supporting plate, and means for supporting said rotatable main supporting plate, said last mentioned means being adjustable to change the axis of rotation of the main supporting plate.

4. In a meter scale printing apparatus for printing numbers about the periphery of meter scales, type for printing on the meter scale, means for moving said type in a predetermined path to effect printing, a disc for supporting the scale to be printed, means for supporting said disc for movement through a circular path, and means for preventing the disc from rotating while moving in the circular path including a rectilinear guide means, means movable in a rectilinear path along said guide means, and means attached to said disc and connected to said means movable in a rectilinear path for preventing rotation of the disc.

5. In a meter scale printing apparatus, a scale supporting disc, a rod attached to said disc, means for supporting said rod for movement in all directions in a predetermined plane while maintaining the rod in parallel positions, a rotatable main supporting plate, a scale plate slidable on said main supporting plate, a pivot stud extending from said slidable scale plate, a passageway in said disc having its side walls in engagement with the pivot stud on the slidable scale plate, a pointer on the disc, a scale on the slidable scale plate cooperating with said pointer to indicate the degrees of rotation of the main supporting plate, a type carrier movable at right angles to said disc, type carried by said type carrier for printing on a scale supported by the scale supporting disc, and means for supporting the main supporting plate for rotation about different axes in accordance with the size of type carried by said type carrier.

6. In a meter scale printing apparatus for printing numbers on meter scales, type for printing on the meter scale, means for moving said type in a predetermined path to effect printing, a disc for supporting the scale to be printed, and means for supporting said disc for movement through a circular path while holding it against rotation about its own axis, said last mentioned means including a rod fixed to the disc and movable in all directions in a given plane while maintaining it in parallel positions.

7. In a meter scale printing apparatus, a main supporting plate, means for supporting the main supporting plate for rotation on an axis fixed with respect to said means, means slidable on the main supporting plate, a scale supporting disc carried by said slidable means, means for preventing said disc from rotating when the main supporting plate is rotated, a reciprocatable type carrier, type positioned on said carrier, means for guiding said type carrier in a path along the axis of rotation of the main supporting plate, and means for reciprocating said carrier in said path.

FRANK R. ROTT.